(12) United States Patent
Tao et al.

(10) Patent No.: US 10,541,441 B2
(45) Date of Patent: Jan. 21, 2020

(54) LITHIUM ION BATTERY HAVING DESIRABLE SAFETY PERFORMANCE

(71) Applicant: Ningde Amperex Technology Limited, NingDe, Fujian Province (CN)

(72) Inventors: Tao Tao, NingDe (CN); Ming Iiang Mo, NingDe (CN)

(73) Assignee: Ningde Amperex Technology Limited, NingDe (CN)

( * ) Notice: Subject to any disclaimer, the term of this patent is extended or adjusted under 35 U.S.C. 154(b) by 390 days.

(21) Appl. No.: 14/596,873

(22) Filed: Jan. 14, 2015

(65) Prior Publication Data
US 2015/0207111 A1    Jul. 23, 2015

(30) Foreign Application Priority Data

Jan. 17, 2014    (CN) .................... 2014 2 0030319 U

(51) Int. Cl.
| | |
|---|---|
| *H01M 10/0525* | (2010.01) |
| *H01M 2/26* | (2006.01) |
| *H01M 2/30* | (2006.01) |
| *H01M 4/13* | (2010.01) |
| *H01M 4/139* | (2010.01) |
| *H01M 10/058* | (2010.01) |

(52) U.S. Cl.
CPC ....... *H01M 10/0525* (2013.01); *H01M 2/263* (2013.01); *H01M 2/30* (2013.01); *H01M 4/13* (2013.01); *H01M 4/139* (2013.01); *H01M 10/058* (2013.01)

(58) Field of Classification Search
None
See application file for complete search history.

(56) References Cited

U.S. PATENT DOCUMENTS

| | | | | |
|---|---|---|---|---|
| 5,017,442 A | * | 5/1991 | Watanabe | H01M 4/74 429/241 |
| 5,478,668 A | * | 12/1995 | Gozdz | C08J 9/28 429/127 |
| 6,100,114 A | * | 8/2000 | Milkovich | H01L 21/563 257/E21.503 |
| 6,551,143 B2 | * | 4/2003 | Tanaka | H01R 12/7088 439/224 |

FOREIGN PATENT DOCUMENTS

| | | |
|---|---|---|
| CN | 201087907 Y | 7/2008 |
| CN | 202495523 U | 10/2012 |

\* cited by examiner

*Primary Examiner* — Tamir Ayad
(74) *Attorney, Agent, or Firm* — Alston & Bird LLP

(57) ABSTRACT

A lithium ion battery having desirable safety performance includes a positive electrode having a positive electrode active material layer, a negative electrode having a negative electrode active material layer, a separator between the positive electrode and the negative electrode, and electrolyte. The positive electrode active material layer is provided with a first recess and a positive lead is soldered in the first recess. The negative electrode active material layer is provided with a second recess and a negative lead is soldered in the second recess. Upper and lower surfaces of the positive lead each is formed with a first insulating glue layer. Surface of the positive electrode active material layer corresponding to the second recess is pasted with a second insulating glue layer.

7 Claims, 2 Drawing Sheets

LITHIUM ION BATTERY HAVING DESIRABLE SAFETY PERFORMANCE

CROSS-REFERENCE TO RELATED APPLICATION

The present patent application claims priority to Chinese patent application number CN 201420030319.4 filed Jan. 17, 2014, which is incorporated by reference herein in its entirety.

TECHNICAL FIELD

The present invention generally relates to lithium ion batteries and, more particularly, relates to a lithium ion battery having desirable safety performance.

BACKGROUND

At present, lithium ion batteries are required to be thinner and thinner as well as have higher and higher energy density, which demands a lithium ion battery has as much energy as possible in a volume as small as possible.

In conventional design of a lithium ion battery, a lead is a component soldered on a current collector to conduct current. Arrangement of the lead will increase the thickness of the lithium ion battery no matter the lithium ion battery adopts a Jelly-roll structure or a laminated structure. In other words, the area where the lead is soldered to the current collector has a largest thickness in the lithium ion battery. The increased thickness due to the lead is about 1~5% of the thickness of an assembled lithium ion battery. Therefore, increase of thickness of a lithium ion battery due to the lead has become one of the key actors which limit the energy density of the lithium ion battery.

Chinese patent publication numbers CN 202495523U and CN 201087907Y each discloses a lithium ion battery which defines a recess on a positive electrode and/or the negative electrode to receive a lead therein. The arrangement of the recess on the positive electrode and/or the negative electrode can reduce the thickness of the lithium ion battery. However, when the recess is defined at one end of the positive electrode or the negative electrode along a length direction thereof, thickness variation around the recess is much larger than the thickness variation of the film afar from the recess. Particularly, the arrangement of the recess may generate a number of corners. The film around the corners is readily peeled off, especially when the negative active material adopts an expansive substance, such as silicon. The structure as previously described may lead to a high internal resistance of the lithium ion battery and affect the capacity of the lithium ion battery. In addition, there is no insulating layer provided on the positive area corresponding to the positive recess or the negative recess, internal short circuit and lithium precipitation may potentially occur to the lithium ion battery, which will inevitably affect the safety performance of the lithium ion battery.

In view of the foregoing, what is needed, therefore, is to provide a lithium ion battery having desirable safety performance.

BRIEF SUMMARY OF VARIOUS EMBODIMENTS OF THE INVENTION

One object of the present invention is to provide a lithium ion battery which has high energy density and desirable safety performance.

According to one embodiment of the present invention, a lithium ion battery having desirable safety performance is provided. The lithium ion battery includes:

a positive electrode, including a positive current collector, a positive electrode active material layer formed on the positive current collector and a positive lead coupled to the positive current collector, the positive electrode active material layer being provided with a first recess and the positive lead being soldered in the first recess;

a negative electrode, including a negative current collector, a negative electrode active material layer formed on the negative current collector and a negative lead coupled to the negative current collector, and the negative electrode active material layer being provided with a second recess and the negative lead being soldered in the second recess;

a separator disposed between the positive electrode and the negative electrode; and electrolyte, wherein upper and lower surfaces of the positive lead each is provided with a first insulating glue layer, a surface of the positive electrode active material layer is pasted with a second insulating glue layer corresponding to the second recess, and the first insulating glue layer formed on the lower surface of the positive lead entirely covers the blank positive current collector in the first recess.

According to one aspect of the present invention, the positive lead is entirely seated in the first recess and the negative lead is entirely seated in the second recess. Due to the arrangement of the first recess on the positive electrode and the second recess on the negative electrode, the positive lead and the negative lead can be received in the first recess and the second recess respectively. Along the thickness direction, the thickness of the positive lead (negative lead) is less than the thickness of the positive electrode (negative electrode). Therefore, the lead will not induce thickness increase of the positive lead or the negative lead. There will be more space for the active material, and energy density of the lithium ion battery is improved remarkably.

According to one aspect of the present invention, the first recess or the second recess is defined via mechanical solvent cleaning or laser cleaning.

According to one aspect of the present invention, the second insulating glue layer has a width larger than a width of the second recess, and the second insulating glue layer has a length larger than a length of the second recess.

According to one aspect of the present invention, the first insulating glue layer or the second insulating glue layer is one of a green insulating glue layer, a black insulating glue layer, a white insulating glue layer or a yellow insulating glue layer.

According to one aspect of the present invention, a distance between a center of the first recess and one end of the positive electrode active material layer is ¼-¾ of a length of the positive electrode active material layer, and a distance between a center of the second recess and one end of the negative electrode active material layer is ¼-¾ of a length of the negative electrode active material layer.

According to one aspect of the present invention, the first recess and the second recess are defined in a middle portion of the positive electrode and the negative electrode respectively. Even though the positive electrode and/or the negative electrode expand, unstable bonding, large thickness variation or even abscission of the positive electrode active material layer or the negative electrode active material layer around the recess is avoided. At the same time, the internal resistance of the lithium ion battery is reduced, and capacity and energy density of the lithium ion battery are improved remarkably in the premise of unchanged battery cell size.

According to one aspect of the present invention, a distance between a center of the first recess and one end of the positive electrode active material layer is half of a length of the positive electrode active material layer, and a distance between a center of the second recess and one end of the negative electrode active material layer is half of a length of the negative electrode active material layer.

According to one aspect of the present invention, the first recess has a length 1-100 mm less than a length of the positive lead, the first recess has a width 1-10 mm larger than a width of the positive lead, the second recess has a length 1-100 mm less than a length of the negative lead, and the second recess has a width 1-10 mm larger than a width of the negative lead.

According to one aspect of the present invention, the first recess has a length 1-100 mm less than a width of the positive electrode active material layer, and the second recess has a length 1-100 mm less than a width of the negative electrode active material layer.

According to one aspect of the present invention, the first recess has a depth no larger than a thickness of the positive electrode active material layer, and the second recess has a depth no larger than a thickness of the negative electrode active material layer.

According to one aspect of the present invention, the first recess has a depth 0.005-0.1 mm larger than a thickness of the positive lead, and the second recess has a depth 0.005-0.1 mm larger than a depth of the negative lead.

Compared with the prior art, due to the arrangement of the first insulating glue layer formed on the upper and lower surfaces of the positive lead and the second insulating glue layer pasted on the surface of the positive electrode active material layer corresponding to the second recess, occurrence of internal short circuit and lithium precipitation in the lithium ion battery is remarkably reduced, and safety performance of the lithium ion battery is improved remarkably in the premise of desirable energy density.

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention:

BRIEF SUMMARY OF VARIOUS EMBODIMENTS OF THE INVENTION

DETAILED DESCRIPTION OF VARIOUS EMBODIMENTS OF THE INVENTION

Figure 1:
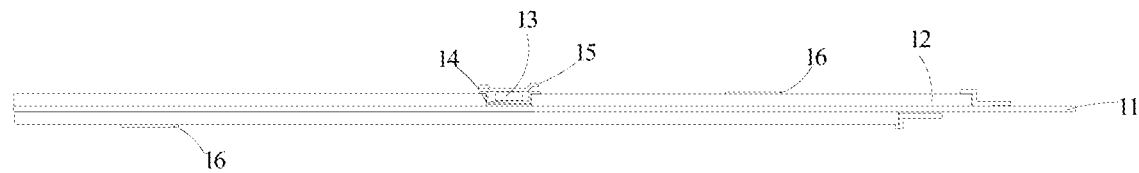
FIG. 1 depicts an exemplary front view of a positive electrode of a lithium ion battery according to one embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Example 1

Figure 2:
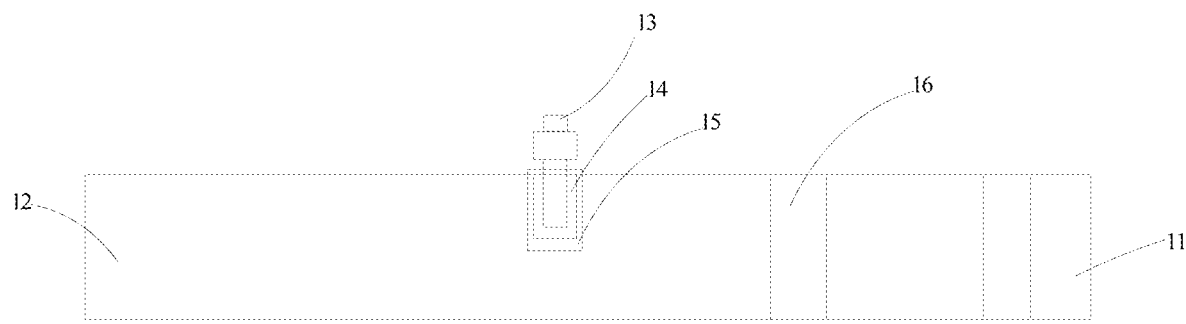
FIG. 2 depicts an exemplary front view of a negative electrode of a lithium ion battery according to one embodiment of the present invention.
Figure 3:
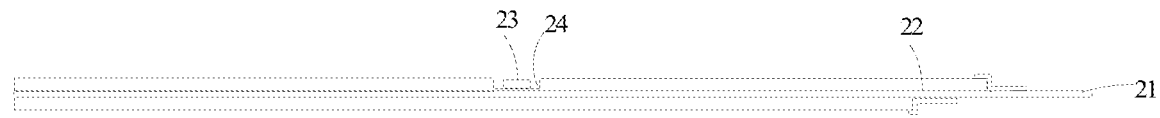
FIG. 3 depicts an exemplary top view of a positive electrode of a lithium ion battery according to one embodiment of the present invention.
Figure 4:
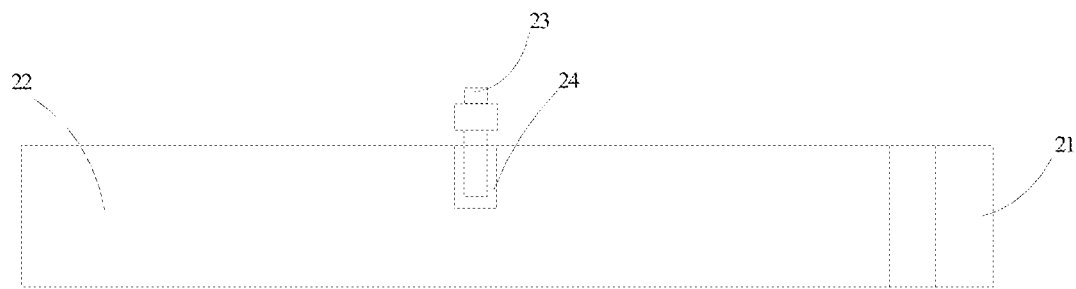
FIG. 4 depicts an exemplary top view of a negative electrode of a lithium ion battery according to one embodiment of the present invention.
Figure 5:
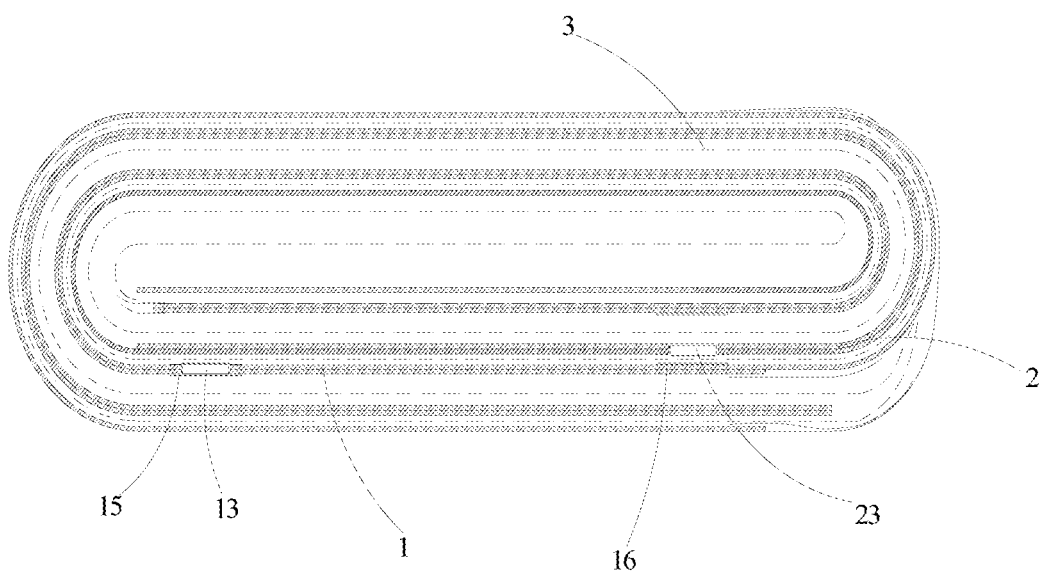
FIG. 5 depicts an exemplary cross-sectional view of a lithium ion battery according to one embodiment of the present invention.

Referring to FIG. 1 to FIG. 5, a lithium ion battery according to one embodiment of the present invention includes a positive electrode 1, a negative electrode 2, a separator 3 disposed between the positive electrode 1 and the negative electrode 2, and electrolyte (not shown). The positive electrode 1 includes a positive current collector 11, a positive electrode active material layer 12 provided on the positive current collector 11, and a positive lead 13. The negative electrode 2 includes a negative current collector 21, a negative electrode active material layer 22 provided on the negative current collector 21, and a negative lead 23. The positive film electrode active material layer 12 defines a first recess 14. The positive lead 13 is soldered and seated in the first recess 14. The negative electrode active material layer 22 defines a second recess 24. The negative lead 23 is soldered and seated in the second recess 24. An upper surface and a lower surface of the positive lead 13 each is formed with a first insulating glue layer 15. A surface of the positive electrode active material layer 12 is pasted with a second insulating glue layer 16 corresponding to the second recess 24.

The second insulating glue layer 16 has a width larger than a width of the second recess 24. The second insulating glue layer 16 has a length larger than a length of the second recess 24.

The first insulating glue layer 15 and the second insulating glue layer 16 are green insulating glue layers.

The distance between the center of the first recess 14 and one end of the positive electrode active material layer 12, i.e. one end of the positive electrode active material layer 12 perpendicular to a length direction of the positive current collector 11 and formed no blank positive current collector 11, is half of a length of the positive electrode active material layer 12. The distance between the center of the second recess 24 and one end of the negative electrode active material layer 22, i.e. one end of the negative electrode active material layer 12 perpendicular to a length direction of the negative current collector 21 and formed no blank negative current collector 21, is half of a length of the negative electrode active material layer 22.

The first recess 14 has a length 25 mm less than a length of the positive lead 13. The first recess 14 has a width 4 mm larger than a width of the positive lead 13. The second recess 24 has a length 25 mm less than a length of the negative lead 23. The second recess has a width 4 mm larger than a width of the negative lead 23.

The first recess 14 has a length 55 mm less than a width of the positive electrode active material layer 13. The second recess 24 has a length 57 mm less than a width of the negative film electrode active material layer 22.

The first recess 14 has a depth less than a thickness of the positive electrode active material layer 12. The second recess 24 has a depth less than a thickness of the negative electrode active material layer 22.

The first recess 14 has a depth 0.02 mm larger than a thickness of the positive lead 13. The second recess 24 has a depth 0.02 mm larger than a thickness of the negative lead 23.

A method for manufacturing a lithium ion battery according to one embodiment of the present invention will be described in detail in view of a 303482 square lithium ion battery (a lithium ion battery having a thickness of 3.0 mm, a width of 34 mm and a length of 82 mm). The method for manufacturing a lithium ion battery includes the steps of:

Preparation of the Positive Electrode:
1) adding 95 wt % positive electrode active material $LiCoO_2$, 2 wt % binder PVDF and 3 wt % conductive agent graphite into solvent NMP, obtaining a positive slurry having a viscosity of 3000-6000 pa·s after fully stirring;
2) coating the positive slurry on an aluminium foil having a thickness of 12 μm, and obtaining a positive electrode 1 having a compacted density of 4.1 $g/cm^3$ and a length of 277 mm, a width of 75 mm, a thickness of 0.114 mm after drying and cold pressing;
3) removing the positive electrode active material layer 12 at a center of the positive electrode 1 (at a middle portion along a length direction of the positive electrode 1) via laser cleaning to define a first recess 14 having a thickness of 0.1 mm, a width of 10 mm and a length of 20 mm;
4) coupling a positive lead 13 having a thickness of 0.08 mm, a width of 6 mm and a length of 45 mm in the first recess 14 via laser welding, the positive lead 13 extending out of the positive electrode 1 of about 15 mm;
5) providing green insulating glue layers on upper and lower surfaces of the positive lead 13, and pasting green insulating glue layer on the positive electrode active material layer 12 corresponding to the second recess 24 in winding, ensuring the green insulating glue layer on the lower surface of the positive lead 13 entirely covering the blank positive current collector 11 in the first recess 14.

Preparation of the Negative Electrode:
1) adding 95 wt % negative electrode active material graphite, 2 wt % bonding agent SBR, 1 wt % thickener CMC and 2 wt % conductive agent graphite in solvent deionized water, and obtaining negative slurry having a viscosity of 1000-3000 pa·s after fully stirring;
2) coating the negative slurry on a copper foil having a thickness of 6 μm, after drying and cold pressing, obtaining a negative electrode having a compaction density of about 1.6 $g/cm^3$ and a length of 285 mm, a width of 77 mm, a thickness of 0.135 mm;
3) removing the negative electrode active material at a center of the negative electrode 2 (at a middle portion along a length direction of the negative electrode 2) via mechanical cleaning to define a second recess 24, the second recess 24 having a thickness of 0.10 mm, a width of 10 mm and a length of 20 mm;
4) providing a negative lead 23 having a thickness of 0.08 mm, a width of 6 mm and a length of 45 mm, soldering the negative lead 23 in the second recess 24, with the negative lead 23 extending out of the negative plate 2 of 15 mm.

Preparation of the electrolyte: fully mixing a mixture of methyl ethyl carbonate (EMC), diethyl carbonate (DEC), ethylene carbonate (EC) and propylene carbonate (PC) having a weight ratio of 1:1:0.5:0.5; adding $LiPF_6$ as solute and obtaining a base electrolyte containing 1M $LiPF_6$; adding 0.5 wt % of two fluorine lithium oxalate borate and 1 wt % of adiponitrile in the base electrolyte, and obtaining electrolyte for use in a lithium ion battery after fully dissolving.

Preparation of the lithium ion battery: coiling the positive electrode 1 and the negative electrode 2 with a separator polyethylene film 3 having a thickness of 0.013 mm interposed between the positive electrode 1 and the negative electrode 2 and obtaining a bared battery cell, with main portion of the bared battery cell having an average thickness of about 2.78 mm; obtaining a final lithium ion battery after drying the bared battery cell, pouring the electrolyte and packaging.

Example 2

Example 2 is almost the same as Example 1, except that:

The distance between a center of the first recess 14 and one end of the positive electrode active material layer 12 (one end of the positive electrode active material layer 12 perpendicular to a length direction of the positive current collector 11 and formed no blank positive current collector 11) is about ¼ of the length of the positive electrode active material layer 12.

The distance between a center of the second recess 24 and one end of the negative electrode active material layer 22 (one end of the negative electrode active material layer 22 perpendicular to a length direction of the negative current collector 21 and formed no blank negative current collector 21) is about ¼ of the length of the negative electrode active material layer 12.

The first recess 14 has a length 75 mm less than a length of the positive lead 13. The first recess 14 has a width 2 mm larger than a width of the positive lead 13. The second recess 24 has a length 75 mm less than a length of the negative lead 23. The second recess 24 has a width 2 mm larger than a width of the negative lead 23.

The first recess 14 has a length 30 mm less than a width of the positive electrode active material layer 12. The second recess 24 has a length 33 mm less than a width of the negative electrode active material layer 22.

The first recess 14 has a depth 0.08 mm larger than a thickness of the positive lead 13. The second recess 24 has a depth 0.08 mm larger than a thickness of the negative lead 23.

The negative active material is silicon.

The first insulating glue layer 15 and the second insulating glue layer 16 are black insulating glue layers.

Other features of Example 2 are the same as have described in Example 1 and will not be detailed further.

Example 3

Example 3 is almost the same as Example 1, except that:

The distance between a center of the first recess 14 and one end of the positive electrode active material layer 12 (one end of the positive electrode active material layer 12 perpendicular to a length direction of the positive current collector 11 and formed no blank positive current collector 11) is about ¾ of the length of the positive electrode active material layer 12.

The distance between a center of the second recess 24 and one end of the negative electrode active material layer 22 (one end of the negative electrode active material layer 22 perpendicular to a length direction of the negative current collector 21 and formed no blank negative current collector 21) is about ¾ of the length of the negative electrode active material layer 12.

The first recess 14 has a length 50 mm less than a length of the positive lead 13. The first recess 14 has a width 8 mm larger than a width of the positive lead 13. The second recess 24 has a length 50 mm less than a length of the negative lead 23. The second recess 24 has a width 8 mm larger than a width of the negative lead 23.

The first recess 14 has a length 70 mm less than a width of the positive electrode active material layer 12. The second recess 24 has a length 73 mm less than a width of the negative electrode active material layer 22.

The first recess 14 has a depth 0.05 mm larger than a thickness of the positive lead 13. The second recess 24 has a depth 0.05 mm larger than a thickness of the negative lead 23.

The negative active material is silicon.

The first insulating glue layer 15 and the second insulating glue layer 16 are white insulating glue layers.

Other features of Example 3 are the same as have described in Example 1 and will not be detailed further.

Example 4

Example 4 is almost the same as Example 2, except that:

The distance between a center of the first recess 14 and one end of the positive electrode active material layer 12 (one end of the positive electrode active material layer 12 perpendicular to a length direction of the positive current collector 11 and formed no blank positive current collector 11) is about ⅙ of the length of the positive electrode active material layer 12.

The distance between a center of the second recess 24 and one end of the negative electrode active material layer 22 (one end of the negative electrode active material layer 22 perpendicular to a length direction of the negative current collector 21 and formed no blank negative current collector 21) is about ⅙ of the length of the negative electrode active material layer 12.

The first insulating glue layer 15 and the second insulating glue layer 16 are yellow insulating glue layer.

Other features of Example 4 are the same as have described in Example 2 and will not be detailed further.

Example 5

Example 5 is almost the same as Example 3, except that:

The distance between a center of the first recess 14 and one end of the positive electrode active material layer 12 (one end of the positive electrode active material layer 12 perpendicular to a length direction of the positive current collector 11 and formed no blank positive current collector 11) is about ⅘ of the length of the positive electrode active material layer 12.

The distance between a center of the second recess 24 and one end of the negative electrode active material layer 22 (one end of the negative electrode active material layer 22 perpendicular to a length direction of the negative current collector 21 and formed no blank negative current collector 21) is about ⅘ of the length of the negative electrode active material layer 12.

Other features of Example 5 are the same as have described in Example 3 and will not be detailed further.

Comparative Example 1

The Comparative Example 1 is almost the same as Example 1, except that, upper and lower surfaces of the positive lead 13 have no first insulating glue layer 15 formed thereon. The surface of the positive electrode active material layer 12 corresponding to the second recess 24 has no second insulating glue layer 16 pasted thereon.

Other features of Comparative Example 1 are the same as have described in Example 1 and will not be detailed further.

Comparative Example 2

The Comparative Example 2 is almost the same as Example 1, except that, the positive lead 13 is soldered to the blank positive current collector 11, the positive electrode active material layer 12 does not have a first recess 14, the negative lead 23 is soldered to the blank negative current collector 21, the negative electrode active material layer 22 does not have a second recess 24. Other features of Comparative Example 2 are the same as have described in Example 1 and will not be detailed further.

10 lithium ion batteries are randomly selected from lithium ion batteries according to Example 1, Example 2, Example 3 and Comparative Example 1 respectively. Each lithium ion battery is carried out a cycle performance test of 300 cycles. Number of the lithium ion batteries occurring short circuit is calculated and the testing result is shown in Table 1.

10 lithium ion batteries are randomly selected from lithium ion batteries according to Example 1, Example 2, Example 3 and Comparative Example 1 respectively. Each lithium ion battery is carried out a cycle performance test of 100 cycles. Each lithium ion battery is disassembled to observe lithium precipitation on the negative plate 2. Number of lithium ion batteries whose negative electrode 2 occurs lithium precipitation is calculated and the testing result is shown in Table 2.

TABLE 1

Short circuit and lithium precipitation on the negative electrode occurs to lithium ion batteries according to Examples 1 to 3 and Comparative Example 1 after cycle test

| Group | Number of batteries occurring short circuit after 300 cycles | Number of batteries occurring lithium precipitation on the negative electrode after 100 cycles |
|---|---|---|
| Example 1 | 0 | 0 |
| Example 2 | 0 | 1 |
| Example 3 | 1 | 0 |
| Comparative Example 1 | 5 | 7 |

As clearly shown in Table 1, due to the first insulating glue layer 15 formed on the upper and lower surfaces of the positive lead 13 and the second insulating glue layer 16 pasted on the surface of the positive electrode active material layer 12 corresponding to the second recess 24, the safety performance of the lithium ion battery can be improved remarkably.

Capacity test, internal resistance test and volumetric energy density test are carried out to the lithium ion batteries according to Example 1 and Comparative Example 2. The test result is shown in Table 2. The capacity test and internal resistance test are carried out on hang machine at 25° C., the discharge capacity is 0.2 C, the internal resistance is impedance under 1000 Hz, and the volumetric energy density=minimum capacity×platform voltage/maximum volume.

TABLE 2

Capacity, internal resistance and volumetric energy density of lithium ion batteries according to Example 1 and Comparative Example 2

| Group | DC resistance (mΩ) | Average capacity (mAh) | Average thickness (mm) | Average volumetric energy density (Wh/L) |
|---|---|---|---|---|
| Example 1 | 55 | 1180 | 2.78 | 563 |
| Comparative Example 2 | 62 | 1170 | 2.84 | 546 |

As clearly shown in Table 2, the structure of the positive electrode and negative electrode according to the present invention can overcome uneven thickness of the battery cell, so as to efficiently utilize the space of the lithium ion battery, improve the capacity and the volumetric energy density of the lithium ion battery, and reduce the internal resistance of the lithium ion battery.

Charging and discharging cycle tests are carried out to lithium ion batteries in accordance with Examples 2 to 5, in which for the sake of illustration, the negative active material in Example 1 is substituted by silicon and referenced as Example 6. The lithium ion batteries are disassembled after 50 cycles. Abscission of active material at the edge of the second recess 24 is shown in Table 3.

TABLE 3

Abscission of active material at the edge of the second recess after charging and discharging cycle test of lithium ion batteries according to Examples 2 to 6

| | Example 4 | Example 2 | Example 6 | Example 3 | Example 5 |
|---|---|---|---|---|---|
| Abscission of active material at the second recess after 50 cycles | Obvious abscission of active material | No obvious abscission of active material | No abscission of active material | No obvious abscission of active material | Obvious abscission of active material |

As clearly shown in Table 3, if the negative active material for use in the negative electrode 2 is apt to serious volume expansion, such as silicon, the first recess 14 in the center of the positive electrode 1 and the second recess 24 in the center of the negative electrode 2 can effectively reduce abscission of active material at the edge of the second recess 24. The negative electrode 2 adopting silicon as active material undertakes serious volume expansion, which may cause the negative electrode 2 defining the second recess at one end thereof, cannot bear the uneven force at the second recess. However, the second recess 24 as describe in Examples 2, 3 and 6 each is located in the center of the negative electrode 2. Two ends of the negative electrode 2 bear almost the same forces and, therefore, abscission of active material at the edge of the second recess 24 can be improved remarkably.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments, it should be appreciated that alternative embodiments without departing from the scope of the appended claims. Although specific terms are employed herein, they are used in a generic and descriptive sense only and not for purposes of limitation.

What is claimed is:

1. A lithium ion battery, comprising:
   a positive electrode, comprising a positive current collector, a positive electrode active material layer containing $LiCoO_2$ and being formed on the positive current collector, and a positive lead coupled to the positive current collector, the positive electrode active material layer being provided with a first recess and the positive lead being soldered in the first recess;
   a negative electrode, comprising a negative current collector, a negative electrode active material layer containing graphite or silicon and being formed on the negative current collector, and a negative lead coupled to the negative current collector, the negative electrode active material layer being provided with a second recess and the negative lead being soldered in the second recess;
   a separator disposed between the positive electrode and the negative electrode; and
   an electrolyte,
   wherein:
   upper and lower surfaces of the positive lead each is provided with a first insulating glue layer, a surface of the positive electrode active material layer is pasted with a second insulating glue layer corresponding to the second recess,
   the second insulating glue layer has a width larger than a width of the second recess, and
   the second insulating glue layer has a length larger than a length of the second recess.

2. The lithium ion battery of claim 1, wherein a distance between a center of the first recess and one end of the positive electrode active material layer is ¼-¾ of a length of the positive electrode active material layer, and a distance between a center of the second recess and one end of the negative electrode active material layer is ¼-¾ of a length of the negative electrode active material layer.

3. The lithium ion battery of claim 1, wherein a distance between a center of the first recess and one end of the positive electrode active material layer is half of a length of the positive electrode active material layer, and a distance between a center of the second recess and one end of the negative electrode active material layer is half of a length of the negative electrode active material layer.

4. The lithium ion battery of claim 1, wherein the first recess has a length 1-100 mm less than a length of the positive lead, the first recess has a width 1-10 mm larger than a width of the positive lead, the second recess has a length 1-100 mm less than a length of the negative lead, and the second recess has a width 1-10 mm larger than a width of the negative lead.

5. The lithium ion battery of claim 1, wherein the first recess has a length 1-100 mm less than a width of the positive electrode active material layer, and the second recess has a length 1-100 mm less than a width of the negative electrode active material layer.

6. The lithium ion battery of claim 1, wherein the first recess has a depth no larger than a thickness of the positive electrode active material layer, and the second recess has a depth no larger than a thickness of the negative electrode active material layer.

7. The lithium ion battery of claim 1, wherein the first recess has a depth 0.005-0.1 mm larger than a thickness of the positive lead, and the second recess has a depth 0.005-0.1 mm larger than a thickness of the negative lead.

* * * * *